Nov. 17, 1959  E. G. MUELLER  2,913,071
PACKAGED BRAKE UNIT FOR RAILWAY TRUCKS
Filed May 28, 1957  2 Sheets-Sheet 1

INVENTOR.
Emil G. Mueller
BY
Adelbert G. Steinmueller
Attorney

Nov. 17, 1959   E. G. MUELLER   2,913,071
PACKAGED BRAKE UNIT FOR RAILWAY TRUCKS
Filed May 28, 1957   2 Sheets-Sheet 2

INVENTOR.
Emil G. Mueller
BY
Attorney

United States Patent Office 2,913,071
Patented Nov. 17, 1959

2,913,071

PACKAGED BRAKE UNIT FOR RAILWAY TRUCKS

Emil G. Mueller, Punta Gorda, Fla., assignor to Westinghouse Air Brake Company, Wilmerding, Pa., a corporation of Pennsylvania Application May 28, 1957, Serial No. 662,249

8 Claims. (Cl. 188—153)

This invention relates to brake units for railway trucks and more particularly relates to so-called "package" brake units wherein most of the actuating mechanism is compact and enclosed in a unitary sectionalized casing to protect against dirt, ice, water, etc. which tend to reduce the operating life of such mechanism.

The principal object of this invention is to provide an improved, relatively simple, compact, package brake unit especially adapted for installation on railway or subway cars where space is limited and embodying novel arrangements for both automatically and manually adjusting slack and also permitting both automatic and manual application of the brakes to a single wheel through the medium of a single, preferably composition-type, brake shoe.

According to this object, the brake unit embodying the invention comprises a brake cylinder piston operatively connected by a piston rod to one end of a straight lever that, at its opposite end, is fulcrumed on a fulcrum pin; and intermediate its ends this lever is operatively connected by a straight link to one arm of a bell crank that is rockably supported at its knee, such that the other arm of said bell crank, which is pivotally connected to a brake head, will effect engagement of a brake shoe with a rotary element, such as the tread of a railway car wheel, to be braked. A slack adjusting device effects rotation of a nut, which is constrained against axial movement to cause a slack adjuster controlled fulcrum pin support member having screw-threaded connection with said nut to be linearly moved in a direction parallel to the axis of said nut to thereby adjust slack clearance between the brake shoe and rotary element. This nut preferably has a wrench receiving socket to permit the nut to be rotated manually to effect manual adjustment of slack to facilitate removal and reinstallation of brake shoes. The "bellcrank" also preferably has an additional arm to which a manual force may be applied for effecting a manual application of brakes.

Other objects and advantages will become apparent from the following more detailed description of the invention, and from the following drawings wherein.

*Description*

Figures 1, 2:
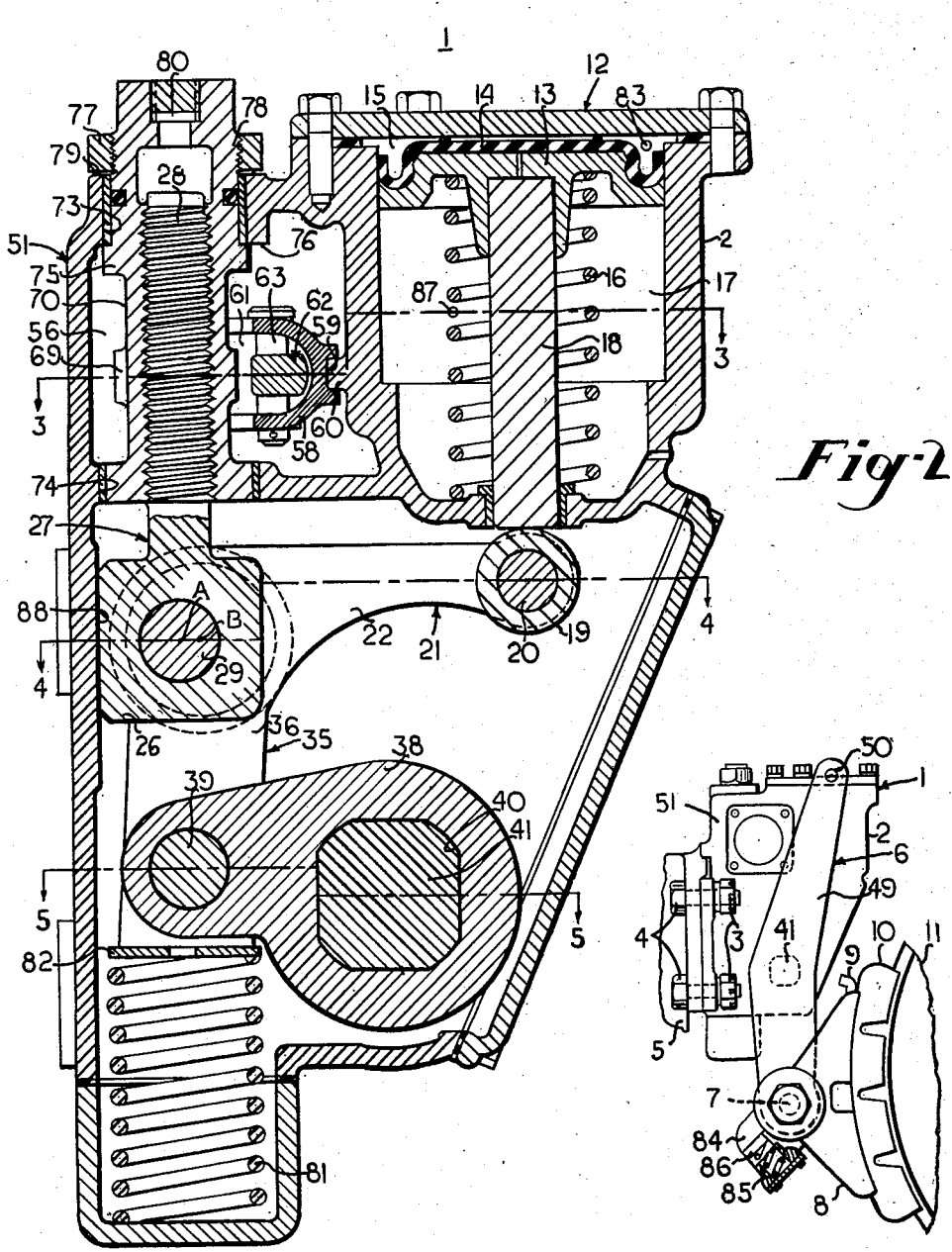
Fig. 1 is a side elevational view of a package brake unit embodying the invention.
Fig. 2 is a vertical sectional view of a portion of the unit shown in Fig. 1.

As shown in Fig. 1, the package brake unit embodying the invention comprises a novel automatic actuating mechanism, designated generally by the reference numeral 1, enclosed in a hollow sectionalized casing 2 suitably secured, as by nuts 3 and bolts 4, to such as the truck frame 5 to permit the entire brake unit to be easily removed merely by unscrewing the nuts 3; said actuating mechanism being operatively connected, in the novel manner hereinafter described, to a brake lever 6 that is pivotally connected at one end through the medium of a pin 7 to a brake head 8 to which is secured, by the usual Christie pin 9, a preferably composition-type brake shoe 10 having a concavely-curved surface for frictional braking engagement with such as the tread of a wheel 11 of a railway car to be braked.

Figure 4:
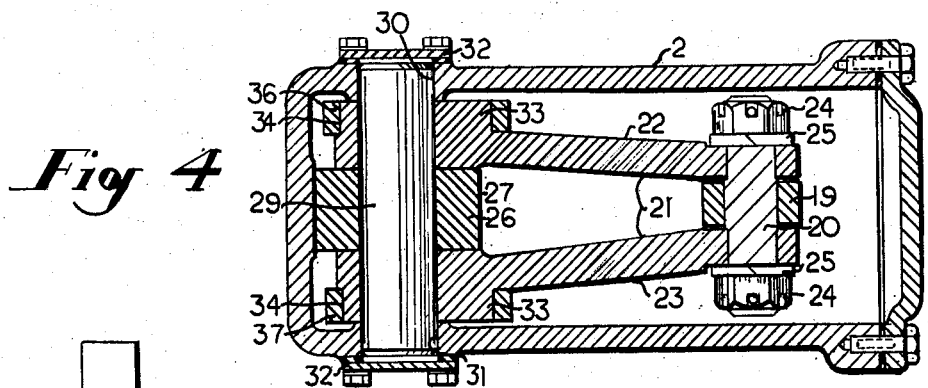
Fig. 4 is a sectional view taken along the line 4—4 of Fig. 2.

As shown in Fig. 2, contained within and constituting a part of the automatic actuating mechanism 1 is a brake cylinder device 12 which comprises a piston 13 that has the usual snap-on type packing cup 14 and is reciprocable within the casing 2. The piston 13 is subject at its packing cup side to pressure of fluid in a pressure chamber 15 and is subject at the opposite side to pressure of a helical return spring 16 in an atmospheric chamber 17. Coaxially connected to the piston 13, as by a press fit, is a piston rod 18 which projects through and exteriorly of chamber 17 and at its projecting end bears on a roller follower 19 that is pivotally connected by a pin 20 to one end of a live lever 21 consisting of two pieces 22, 23 (either separate or, if desired, joined by a web) which, as best shown in Fig. 4, are of opposing configuration and are disposed at each side of the roller follower with slight lateral clearance to permit said follower to rotate freely about said pin without lateral binding; said pin being suitably retained against axial shifting such as by screw-threaded connection with nuts 24 bearing on lock washers 25 that in turn bear against the outer faces or sides of the respective pieces 22, 23.

The spaced inner faces of the pieces 22, 23, adjacent their ends farthest from pin 20, abut opposite parallel faces of a block-like depending portion 26 of a slack adjuster controlled fulcrum pin supporting member 27 having an externally threaded cylindrical upper portion 28 (Fig. 2). A fulcrum pin 29, having an axis A parallel to the axis of pin 20, passes through the portion 26 and pieces 22, 23 and is carried by the member 27, as will become apparent from subsequent description. The outer ends of pin 29 ride within spaced slots 30, 31 which are provided in the casing 2 and are elongated in a direction perpendicular to the plane of Fig. 4 to laterally confine the pin but permit the pin to be moved upwardly and downwardly, as viewed in Fig. 2, by the member 27. Cover plates 32, suitably secured to the casing adjacent the outer ends of the slots 30, 31, confine the pin 29 within the casing and also prevent entry of dirt, dust, water, etc. into the casing.

Figure 5:
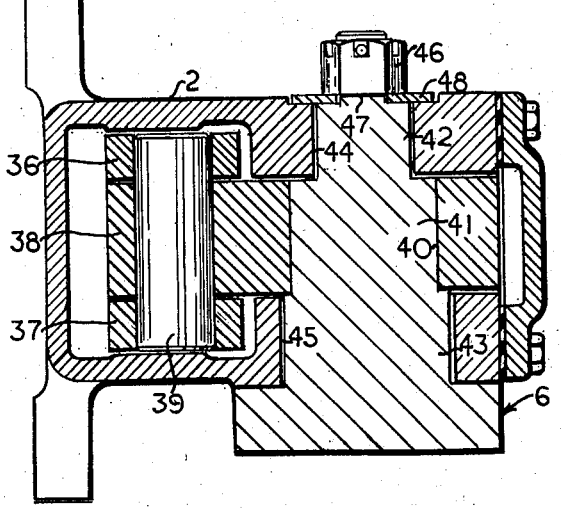
Fig. 5 is a sectional view taken along the line 5—5 of Fig. 2.

Each of the pieces 22, 23 has, at its respective end nearest pin 29, an outwardly directed cam boss 33 providing a cam surface 34 preferably in the form of a perfect circle having an axis B (Fig. 2) eccentric to the axis of fulcrum pin 29. A link 35 preferably comprises two spaced parts 36, 37 of opposing configuration, each at one end having a ring pivotally mounted on and about a respective cam boss 33 of the pieces 22, 23 and each near the opposite end (Fig. 5) being pivotally mounted to one end of a lever 38 through the medium of a floating pin 39 having an axis parallel to the axes of pins 20 and 29; said lever 38 being interposed between and loosely laterally engaging the parts 36, 37 to permit said lever and parts to pivot freely without lateral binding. Near the opposite end of lever 38 is a generally square through opening 40, having an axis parallel to that of the pin 39, for receiving a generally square mating shank or projection 41 formed on the brake lever 6, such that the levers 38 and 6 will be rigidly spline-connected and, as connected, constitute a bell-crank type lever. The brake lever 6 has two cylindrical portions 42, 43 of different diameters arranged coaxially with each other and with the shank 41 and disposed to either side of said shank; said portions being journaled within a small bore 44 and a larger bore 45, respectively, provided in the casing, such that the "bell-crank" 38, 6 will be rockably supported at its knee. The brake lever 6 is held in place, such as by a nut 46 which has screw-threaded connection with a stud 47 and holds a washer 48 up against the recessed outer face of the casing in encirclement of smaller bore 44.

The brake lever 6 preferably has an extension or arm 49 (Fig. 1) that extends from proximity of shank 41 in a direction generally away from the pin 7; said arm near its outer end being adapted at 50 for connection with means, such as a hand brake cable (not shown), for permitting the brake lever to be rocked in a counterclockwise direction relative to and within the casing bores 44, 45 for thereby carrying the brake shoe 10 into frictional contact with the wheel 11 through the medium of pin 7 and brake head 8.

Figure 3:
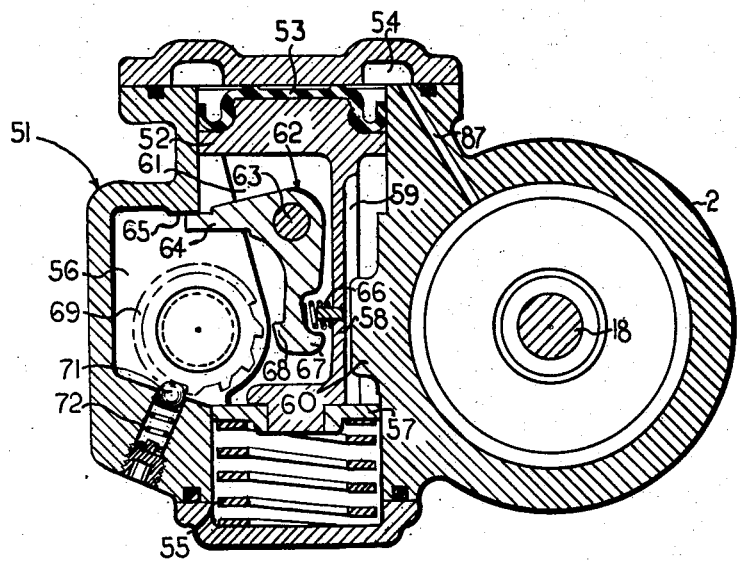
Fig. 3 is a sectional view taken along the line 3—3 of Fig. 2.

Referring now to Figs. 2 and 3, there is also enclosed within the casing 2 a pneumatically controlled slack adjusting device 51 comprising a piston 52 having a snap-on type packing cup 53 and slidably mounted in a bore in the casing. The piston 52 is subject at its packing cup side to pressure of fluid in a chamber 54 and is subject at the opposite side to pressure of a flat helical spring 55 that is contained in an atmospheric chamber 56 and acts on the piston through the medium of a disc-shaped spring guide 57 and a piston follower 58, which is preferably formed integrally with the piston. In one side of the follower 58 is guide groove 59 that is elongated in a direction parallel to the axis of the piston and accommodates a stationary lug 60 projecting from the side wall of chamber 56, such that said lug, by riding in said groove during reciprocation of the piston, constrains the piston against rotation. In the opposite side of follower 58 is a generally semi-circular recess or slot 61 which is also elongated in a direction parallel to the axis of the piston and accommodates a bell-crank lever 62 which is rockably connected at its knee to the follower 58 through the medium of a transverse pin 63 carried in aligned bores (not shown) provided in the side walls of said slot and having axes perpendicular to the axis of said piston.

When piston 52 and hence the pin 63 and lever 62 are in their respective uppermost or normal positions, in which they are shown, the outer side of one arm 64 of said lever will be held in abutting contact with a stop shoulder 65 provided in the wall of chamber 56. This prevents a helical bias spring 66, which is interposed between the base of slot 61 and a recessed portion in the outer side of the other arm 67 of said lever, from effecting clockwise rotation of lever 62 about pin 63 of a sufficient degree to carry a pawl 68, formed integrally with the inner side of arm 67, into engagement with a toothed or ratchet portion 69 of a nut 70 (Fig. 2); and hence the pawl 68 will be held disengaged from said nut against resistance of spring 66. A preferably ball-type detent 71 is biased into contact with the ratchet portion 69 by a suitably retained helical spring 72, such that said detent normally extends into a space between adjacent teeth on said ratchet portion and thereby normally restrains the nut 70 against rotation due to vibration, etc.

The nut 70 (Fig. 2) is journaled within suitable bushings mounted in spaced coaxially arranged bores 73, 74 provided in the casing 2; however, the nut is held with very slight axial play in a substantially fixed axial position by loose contact of an outwardly directed flange 75 on the nut with a positioning shoulder 76 formed in the casing in encirclement of the inner end of bore 73, such contact being effected and maintained by a positioning nut 77 that has screw-threaded engagement with an externally threaded portion 78 of nut 70 that projects exteriorly of bore 73 and loosely bears against a shoulder 79 provided on the casing in encirclement of the outer end of bore 73. The nut 70 also has a wrench-receiving socket 80 extending axially inward from its outer end to permit said nut to be rotated manually. Whenever the nut 70 is rotated automatically by the pawl 68 in the manner hereinafter to be explained or is rotated manually, the nut 77 (which will turn with the nut 70) and shoulder 76 will constrain the nut 70 against axial movement; and consequently the screw-threaded portion 28 of member 27, which has screw-threaded connection within the nut, will be moved axially and thus linearly move the block-like portion 26 of said member and the fulcrum pin 29 carried thereby, for varying the normal position of the lever 21, link 35 and of pin 39 and thereby of the "bell-crank" 38, 6 and brake head 8 and brake shoe 10 for thereby varying the slack clearance between the brake shoe and wheel 11.

A helical spring 81 (Fig. 2) housed in a recess in the casing acts through the medium of a flat spring follower 82 on the link 35 for biasing the "bell-crank" 38, 6, through the medium of pin 39, in a clockwise direction relative to the bearing bores 44, 45 to operatively disengage the brake shoe 10 from the wheel 11; and said spring 81 also serves to apply to the lever 21 an upwardly directed force which acts at B (intermediate the axis A of pin 29 and the follower 19) for maintaining said follower in contact with the piston rod 18.

*Operation*

Assuming initially that the chamber 15 of the brake cylinder device 12 is vented, the various components will be in the respective positions in which they are shown in the drawings.

To effect an application of brakes, fluid under pressure is supplied to chamber 15 via a suitable port 83 in the casing 2. Fluid pressure in chamber 15 will shift the piston 13 against resistance of spring 16 for applying a moment to lever 21 through the medium of piston rod 18 and roller follower 19. This moment will cause lever 21 to fulcrum about pin 29 and thereby transmit, through link 35 and pin 39 and against resistance of spring 81, a moment to "bell-crank" 38, 6 for rocking the latter in a counterclockwise direction (Fig. 2) relative to the bearing bores 44, 45 and thereby causing the brake shoe 10 to be carried into frictional braking engagement with the wheel 11.

To release brakes, fluid under pressure is released from chamber 15 via port 83, for causing return spring 16 to return the piston 13 to release position and thereby permit spring 81 to rock the "bell-crank" 38, 6 clockwise for withdrawing the brake shoe 10 from the wheel 11. The usual friction elements 84 (only one of which is shown in Fig. 1) are carried by pin 7 and frictionally engage opposite sides of the brake head 8; and each element 84 carries a spring 85 which bears against a lug 86 on the brake lever 6, for biasing the brake head and hence the brake shoe 10 counterclockwise relative to the pin 7 for maintaining the braking surface of the brake shoe nominally concentric with the braked surface of the wheel 11 when the brake shoe is disengaged from the wheel.

If slack clearance is within a permissible limit, the piston 13 will not, during a brake application, travel past a port 87 that is provided in the casing and leads from the piston bore to chamber 54 (Fig. 3); and hence, so long as slack clearance is within the permissible limit, port 87 and chamber 54 will be continuously exposed to atmospheric pressure in chamber 17, and the slack adjuster piston 52 will not be actuated.

If, however, due to brake shoe wear, the slack clearance should exceed the permissible limit, the piston 13 and packing cup 14 will have to travel beyond port 87 in order to effect a brake application, and hence port 87 will be uncovered to chamber 15 and permit fluid under pressure to flow via chamber 15 and port 87 to chamber 54, thereby causing piston 52 to move against resistance of spring 55 and operatively carry the pin 63 downward. As pin 63 is moved downwardly, spring 66 will rock the lever 62 clockwise about pin 63 causing lever arm 64 initially to pivot on the shoulder 65 for controlling movement of the pawl 68 toward the ratchet portion 69; and then, as said pin continues to move down, the pawl will engage said ratchet portion and thereby prevent further clockwise rocking of the lever 62; and thereafter the arm 64 will be carried out of contact with shoulder 65 and permit the pawl to firmly seat behind a tooth on said ratchet portion.

The pawl 68 will be maintained thus engaged with the ratchet portion 69 until chamber 15 is vented for causing a release of brakes. As chamber 15 is vented, fluid under pressure will be released from chamber 54 and port 87 initially via chamber 15 and then, if necessary, after piston 13 has moved up past port 87, via atmospheric chamber 17. As fluid under pressure is released from chamber 54, the piston 52 will be moved upwardly by pressure of spring 55. During this upward movement, the piston 52 will carry the lever 62 upwardly through the medium of pin 63 and cause the pawl 68, which is initially held seated behind a tooth on the ratchet portion 69 by pressure of spring 66, to pull on said tooth and thereby rotate the ratchet portion counterclockwise (as viewed in Fig. 5) through a small arcuate increment, after which lever arm 64 will contact shoulder 65 and pivot lever 62 counterclockwise relative to upwardly moving pin 63 for thereby fully disengaging pawl 68 from the ratchet portion 69. Meanwhile, the ball-type detent 71, which was depressed against the relatively light resistance of spring 72 during and in consequence of the rotation of the ratchet portion 69, will re-engage the ratchet portion and thereby restrain the nut 70 against undesired subsequent rotation.

Meanwhile, during rotation of the ratchet portion 69 and hence of nut 70, the member 27 will be moved downwardly, as viewed in Fig. 2, due to axial movement of screw-threaded portion 28, and cause block-like portion 26 to slide along the casing wall 88 and thereby carry fulcrum pin 29 downwardly for causing the "bell-crank" 38, 6 to be rocked a corresponding increment in a counter-clockwise direction to thereby reduce the slack clearance between the brake shoe 10 and wheel 11 and thus reduce the travel required of brake cylinder piston 13 to effect a subsequent brake application, as will be understood from previous description.

Hence, after the chamber 15 has been vented for releasing brakes, the various components will once again assume the respective positions in which they are shown in the drawings; except that if the slack adjuster piston 52 was actuated during the preceding brake application, the fulcrum pin 29 will be positioned slightly below the position in which it had been held during said brake application.

In order to increase the slack clearance to facilitate replacement of a worn brake shoe or to initially adjust the slack clearance following installation of a new brake shoe, the nut 70 is rotated manually by a wrench inserted into the wrench-receiving socket 80.

Having now described the invention, what I claim as new and desire to secure by Letters Patent, is:

1. A brake unit of the type comprising a brake shoe carried by a brake head and adapted for frictional braking engagement with a rotary element to be braked, the combination of hollow casing means, a brake lever rockably supported by and arranged exteriorly of said casing means and pivotally connected at one end to the brake head, a second lever contained in said casing means and operatively connected at one end to said brake lever in proximity of the point where the latter is rockably supported, a third lever contained in said casing means and fulcrumed at one end, means contained in said casing means for supporting the fulcrumed end of said third lever, a roller follower pivotally connected to the other end of said third lever, a brake cylinder comprising a piston reciprocable within said casing means and responsive to supply of fluid under pressure to a chamber to provide a braking moment, means for biasing the piston to a release position upon venting of the chamber, a piston rod positively connected at one end to said piston and at the opposite end engageable with said follower, generally straight link means contained in the casing means and pivotally connected near its respective ends to the other end of said second lever and also to said third lever at a point on said third lever intermediate said follower and the supporting means for the third lever, and a spring contained in the casing means and acting on said link means for so biasing said third lever as to maintain said roller engaged with said piston rod while also biasing said brake lever through the medium of said second lever to a position for operatively holding the brake shoe disengaged from the rotary element.

2. In a brake unit of the type comprising a brake shoe for frictional braking engagement with a rotary element to be braked, the combination of a casing, a slack adjusting device comprising a movable abutment reciprocable within a bore in the casing and normally biased to one position and operable by fluid under pressure to another position, a rotatable nut constrained in the casing against axial movement and having intermediate its ends an externally toothed ratchet portion, a bell-crank rockably carried by said movable abutment and having one arm provided with a pawl, bias means for rocking said bell-crank in one arcuate direction for effecting engagement of said pawl with said ratchet portion during movement of said movable abutment to its other position and for causing said pawl to effect a predetermined slight degree of rotation of said nut during the initial phase of subsequent movement of said movable abutment toward its one position, stop means carried by the casing for engaging the other arm of said bell-crank to rock said bell-crank in the opposite direction during the final phase of movement of said bell-crank to its one position to thereby effect disengagement of said pawl from said ratchet portion, an externally threaded cylindrical member having screw-threaded engagement within said nut, means engaging a guide wall in the casing for constraining said cylindrical member against rotation for thereby causing said cylindrical member to move linearly in an axial direction responsively to rotation of said nut, a fulcrum pin disposed at right angles to the axis of said cylindrical member and operably connected to said cylindrical member so as to be linearly movable thereby; a lever fulcrumed at one end on said fulcrum pin; a brake cylinder comprising a piston reciprocable within the casing and operatively connected to the opposite end of said lever and operable by fluid under pressure within or beyond a normal operating range according to whether slack between the brake shoe and rotary element is less than or exceeds a preselected amount, said piston being operative while beyond said range to effect supply of fluid under pressure to said movable abutment and operative while within said range to effect venting of fluid under pressure from said movable abutment; means constituting a second bell crank rockably supported at its knee by the casing and having one arm operatively connected to the brake shoe, and a link pivotally connected to the other arm of said second bell-crank and pivotally connected to said lever at a point intermediate said fulcrum pin and said opposite end of said lever, such that upon supply of fluid under pressure to the piston said piston will act through said lever, said link and the second bell-crank for effecting a brake application and if in effecting such application said piston travels beyond said range the movable abutment will be actuated to its other position for causing the pawl to engage the ratchet portion so that upon release of fluid under pressure from said piston and thereby from said movable abutment said nut will be rotated for causing said cylindrical member to linearly move the fulcrum pin toward said other arm of said second bell-crank for reducing such slack.

3. In a brake unit of the type comprising a brake shoe for frictional braking engagement with a rotary element to be braked, the combination of a casing, a slack adjusting nut rotatably disposed in the casing, means cooperating with a shoulder in said casing for constraining said nut against axial movement, a member having screw-threaded connection with said nut and restrained against rotation by contact with a guide surface of said casing so as to be linearly movable relative to said nut upon rotation of said nut, a fulcrum pin carried by said member such that the axis of said pin is at right angles to the axis of said nut, a brake cylinder piston reciprocable within the casing and operable by fluid under pressure within or beyond a normal operating range during a brake application according as slack between the brake shoe and rotary element is less than or exceeds a preselected amount and operable upon venting of such fluid under pressure to move to a release position, means under the control of the brake cylinder piston and operative to effect rotation of said nut a predetermined degree responsively to return travel of said brake cylinder piston to within said range and toward release position following travel of said piston beyond said range, a lever pivotally connected at one end to said fulcrum pin and operably connected at the opposite end to said brake cylinder piston, means constituting a bell-crank rockably supported at its knee by the casing and having one arm operatively connected to the brake shoe, and a link operatively connecting said lever to the other arm of said bell-crank.

4. A brake unit as claimed in claim 3, further characterized in that the nut has a wrench receiving socket for permitting manual rotation of the nut, and the bell-crank has an additional positively connected arm to the outer end of which a manual force may be applied for rocking the bell-crank to manually effect an application of brakes.

5. In a brake unit of the type comprising a brake shoe for frictional braking engagement with a rotary element to be braked, the combination of a casing, a slack adjusting nut rotatably disposed in the casing, means cooperating with a shoulder in said casing for constraining said nut against axial movement, a member having screw-threaded connection with said nut and restrained against rotation by contact with a guide surface of said casing so as to be linearly movable relative to said nut upon rotation of said nut, a fulcrum pin carried by said member such that the axis of said pin is at right angles to the axis of said nut, a brake cylinder piston reciprocable within the casing and movable, by supply of fluid under pressure to a pressure chamber, within or beyond a normal operating range during a brake application according as slack between the brake shoe and rotary element is less than or exceeds a preselected amount and operable upon venting of said pressure chamber to move to a release position, means under the control of the brake cylinder piston and operative to effect rotation of said nut a predetermined degree responsively to return travel of said brake cylinder piston to within said range and toward release position following travel of said piston beyond said range, a piston rod coaxially connected to the side of said piston opposite said pressure chamber, roller means for engaging said piston rod, a first lever fulcrumed on said fulcrum pin and carrying said roller means and operably connected via said roller means to said brake cylinder piston rod, a two-armed lever rockably supported intermediate its arms on the casing and having one arm operatively connected to the brake shoe, and a link operatively connecting said first lever to the other arm of said two-armed lever.

6. In a brake unit of the type comprising a brake shoe for frictional braking engagement with a rotary element to be braked, the combination of a casing, a slack adjusting nut rotatably disposed in the casing, means cooperating with a shoulder in said casing for constraining said nut against axial movement, a member having screw-threaded connection with said nut and restrained against rotation by contact with a guide surface of said casing so as to be linearly movable relative to said nut upon rotation of said nut, a fulcrum pin carried by said member such that the axis of said pin is at right angles to the axis of said nut, a brake cylinder piston reciprocable within the casing and operable by fluid under pressure within or beyond a normal operating range during a brake application according as slack between the brake shoe and rotary element is less than or exceeds a preselected amount and operable upon venting of such fluid under pressure to move to a release position, means under the control of the brake cylinder piston and operative to effect rotation of said nut a predetermined degree responsively to return travel of said brake cylinder piston to within said range and toward release position following travel of said piston beyond said range, a live lever hingedly connected to said fulcrum pin and operably connected near its one end to said piston, said live lever having in proximity of its other end a circular cam boss which is arranged eccentrically to the axis of said fulcrum pin, a link having a ring which encircles said cam boss to provide a hinged connection between said link and live lever, and a second lever rockably supported intermediate its ends on the casing for movement in a plane perpendicular to the axis of said fulcrum pin and adjacent its one end operatively connected to the brake shoe, and adjacent its opposite end pivotally connected to said link.

7. In a brake unit of the type comprising a brake shoe for frictional braking engagement with a rotary element to be braked, the combination of a rotatable nut constrained against axial movement, means controlled by pressure of fluid in a chamber and an opposing bias and operative to effect rotation of said nut a predetermined degree responsively to a release of fluid under pressure from said chamber following supply of fluid under pressure thereto, a fulcrum pin having an axis at right angles to the axis of said nut, a linearly guided member having screw-threaded connection with said nut and carrying said fulcrum pin such that upon rotation of said nut said fulcrum pin will be moved linearly in a direction parallel to the axis of said nut, a brake cylinder comprising a piston normally biased to a release position and movable by fluid under pressure from said position within or beyond a normal operating range in a brake application direction according to whether slack between the brake shoe and rotary element is less than or exceeds a preselected amount, said piston being operative to effect supply of fluid under pressure to said chamber or effect release of fluid under pressure from said chamber according as said piston is beyond or within said range, a lever fulcrumed near one end on said fulcrum pin and operably connected near the opposite end to said piston, means constituting a bell-crank rockably supported at its knee for movement in a plane perpendicular to the axis of said fulcrum pin and having one arm operatively connected to the brake shoe, and a link pivotally connected to the other arm of the bell-crank and pivotally connected to said lever at a point intermediate said fulcrum pin and said opposite end of said lever, said lever at its one end having a circular cam surface arranged eccentrically to the axis of said fulcrum pin, and said link having a ring which encircles said cam surface for providing the pivotal connection between the link and lever.

8. In a brake unit of the type comprising a brake head which is operable to carry an affixed brake shoe into and out of frictional braking engagement with a rotary element to be braked, the combination of a casing, a brake cylinder piston reciprocable within the casing and movable, by supply of fluid under pressure to a pressure chamber, within or beyond a normal operating range during a brake application according as slack between the brake shoe and rotary element is less than or exceeds a preselected amount and operable upon venting of said pressure chamber to move to a release position, a piston rod connected to said piston, a fulcrum pin shiftable translationally in a direction transversely of its axis, fulcrum-pin-supporting means normally holding said fulcrum pin in a fixed position to prevent such shifting thereof, a live lever fulcrumed on said fulcrum pin and operably engaging said piston rod, another lever rockably supported intermediate its ends on the casing and hingedly connected at one end to the brake head, a link hingedly connected to the other end of said other lever and hingedly connected to said live lever eccentrically of the axis of said fulcrum pin, whereby upon supply of fluid under pressure to said pressure chamber, the piston rod will apply a moment to said live lever causing it to rock relative to said fulcrum pin and apply through the link a moment on the other lever for causing the brake shoe to be carried into frictional braking engagement with the rotary member, said casing providing another chamber which is normally vented and is charged with pressure fluid only while said brake cylinder piston is beyond said normal operating range, fluid pressure motor means controlled by pressure of fluid in said other chamber, and means providing an adjustable connection between said motor means and supporting means and operative responsively to venting of said other chamber following charging thereof to effect movement of said supporting means for thereby translationally shifting said fulcrum pin a predetermined distance in a slack-reducing direction so as to reduce the extent of movement of said piston and piston rod which will be required to effect such frictional braking engagement during the next charging of said pressure chamber.

References Cited in the file of this patent

UNITED STATES PATENTS

| | | |
|---|---|---|
| 1,559,503 | Clegg | Oct. 27, 1925 |
| 2,118,236 | Schwentler | May 24, 1938 |
| 2,223,043 | Miller | Nov. 26, 1940 |
| 2,286,517 | Tack | June 16, 1942 |
| 2,561,454 | Williams | July 24, 1951 |
| 2,812,042 | Runken | Nov. 5, 1957 |
| 2,833,381 | Frola et al. | May 6, 1958 |